United States Patent [19]

Ohara et al.

[11] 4,427,829
[45] Jan. 24, 1984

[54] POLYCARBONATE RESIN COMPOSITION

[75] Inventors: Osamu Ohara; Kazuo Kishimoto, both of Matsuyama, Japan

[73] Assignee: Teijin Chemicals, Ltd., Tokyo, Japan

[21] Appl. No.: 357,597

[22] Filed: Mar. 12, 1982

[30] Foreign Application Priority Data

Mar. 19, 1981 [JP] Japan .................................. 56-38730

[51] Int. Cl.³ ........................ C08L 69/00; C08L 23/20
[52] U.S. Cl. ..................................... 525/67; 525/133; 525/146
[58] Field of Search ........................... 525/67, 146, 133

[56] References Cited

U.S. PATENT DOCUMENTS 3,880,783  4/1975  Serini et al. .......................... 525/146
4,299,928 11/1981  Witman ................................. 525/67

FOREIGN PATENT DOCUMENTS 1752471  2/1967  Canada ................................... 525/67

*Primary Examiner*—Wilbert J. Briggs, Sr.
*Attorney, Agent, or Firm*—Sherman & Shalloway

[57] ABSTRACT

A polycarbonate resin composition comprising as main components
(A) 100 parts by weight of a polycarbonate resin,
(B) 0.3 to 10 parts by weight of a polymethylpentene resin,
(C) 0.3 to 10 parts weight of an elastomeric acrylic graft copolymer resin composed of a crosslinked acrylic copolymer containing not less than 3% by weight of butadiene as a comonomer and being free from ethylene as a trunk polymer and, grafted thereto, at least one grafting monomer selected from the group consisting of styrene, alkyl acrylates and alkyl methacrylates, and
(D) 0.3 to 10 parts by weight of an isobutylene copolymer rubber composed of a major amount of isobutylene and a minor amount of isoprene, the total amount of (B), (C) and (D) being 2 to 20 parts by weight.

10 Claims, No Drawings

POLYCARBONATE RESIN COMPOSITION

This invention relates to a polycarbonate resin composition having improved properties which comprises a polycarbonate resin and a modifier resin. Particularly, it relates to a polycarbonate resin composition having improved properties, such as excellent resistance to solvents, particularly to gasoline, excellent impact strength especially at low temperatures, resistance to the deterioration of impact strength by heat aging, and excellent mold releasability during molding, in a well-balanced combination.

More particularly, this invention pertains to a polycarbonate resin composition comprising as main components (A) 100 parts by weight of a polycarbonate resin, (B) 0.3 to 10 parts by weight of a polymethylpentene resin, (C) 0.3 to 10 parts by weight of an elastomeric acrylic graft copolymer resin composed of a crosslinked acrylic copolymer containing not less than 3% by weight of butadiene as a comonomer and being free from ethylene as a trunk polymer and, grafted thereto, at least one grafting monomer selected from the group consisting of styrene, alkyl acrylates and alkyl methacrylates, and (D) 0.3 to 10 parts by weight of an isobutylene copolymer rubber composed of a major amount of isobutylene and a minor amount of isoprene, the total amount of (B), (C) and (D) being 2 to 20 parts by weight.

As is well known, polycarbonate resins have found extensive use as engineering plastics because of their high impact strength, self-extinguishing properties, higher heat resistance than other resins, excellent electrical properties and high dimensional stability. On the other hand, they have the defect of possessing low solvent resistance. For this reason, molded articles of polycarbonate resin having a high residual stress which are either large-sized or complex in shape are susceptible to stress cracking upon contact with an atmosphere of a solvent, and despite their high impact strength, their application to uses which require gasoline resistance, for example as automotive parts, has been limited. This limitation is greater when the polycarbonate molded articles are to be used as automobile bumpers.

Various polycarbonate resin compositions, especially those composed of a polycarbonate resin and a modifier resin, have been suggested in the past in an attempt to improve the solvent resistance of the polycarbonate without substantially sacrificing its desirable properties. It has been extremely difficult however to provide a polycarbonate resin composition which has satisfactory improved properties in a well-balanced combination.

For example, Japanese Patent Publication No. 18823/1967 (published on Sept. 26, 1967) discloses a polycarbonate resin composition composed of 100 parts by weight of a polycarbonate resin of the 4,4'-dihydroxy diarylalkane type and up to 50 parts by weight of butyl rubber intended for improving the physical properties, especially impact strength and moldability, of the polycarbonate resin. This publication, however, does not at all disclose the conjoint use of a polyolefin resin, such as a polyethylene resin, a polymethylpentene resin, etc. and an elastomeric acrylic graft copolymer. It neither gives any statement about the intention and specific means of imparting excellent gasoline resistance, excellent low-temperature impact strength, excellent resistance to the deterioration of impact strength by heat aging, and excellent mold releasability in a well-balanced combination. As shown by a comparative experiment to be described hereinbelow, if the composition of this invention lacks the polymethylpentene resin and/or the elastomeric acrylic copolymer, it is impossible to improve the above properties in a well-balanced state.

U.S. Pat. No. 3,431,224 (issued on Mar. 4, 1969) discloses a resin composition having higher resistance to environmental stress crazing and cracking which is prepared by incorporating a polycarbonate resin with at least one member of the class consisting of polyethylene, polypropylene, polyisobutylene, a copolymer of ethylene and an alkyl acrylate, a copolymer of ethylene and propylene, a cellulose ester, a polyamide, a polyvinyl acetal, an alkyl cellulose ester and a polyurethan elastomer. The U.S. patent, however, completely fails to disclose the use of an elastomeric acrylic graft copolymer resin composed of a crosslinked acrylic copolymer containing not less than 3% by weight of butadiene as a comonomer and being free from ethylene as a trunk polymer and, grafted thereto, at least one grafting monomer selected from the group consisting of styrene, alkyl acrylates and alkyl methacrylates, and an isobutylene copolymer rubber composed of a major amount of isobutylene and a minor amount of isoprene and a polymethylpentene resin in combination with a polycarbonate resin. The patent discloses the resistance of the resin composition to such solvents as acetone, heptane and carbon tetrachloride, but nothing is disclosed there about its gasoline resistance. It is quite silent on the intention and specific means of imparting excellent gasoline resistance, excellent low-temperature impact strength, excellent resistance to the deterioration of impact strength by heat aging and excellent mold releasability in combination.

U.S. Pat. No. 3,655,824 (issued on Apr. 11, 1972; corresponding to Japanese Patent Publication No. 29308/1973 published on Sept. 8, 1973) discloses a polycarbonate resin composition which is tough and has superior crazing resistance and weathering resistance. The U.S. patent describes a resinous composition comprising an admixture of:

(I) 5 to 95% by weight of a resinous composition selected from the group consisting of (1) a resinous polymer prepared by graft polymerizing 40–100% by weight of at least one monomeric vinyl aromatic hydrocarbon and 60–0% by weight of an ethylenic comonomer, with a rubbery polymer formed from 50–100% by weight of at least one monomer selected from the group consisting of alkyl acrylates and alkyl methacrylates, each containing between 1–18 carbon atoms in the alkyl group, and 50–0% by weight of an ethylenic comonomer, and (2) a resinous polymeric mixture prepared by admixing a polymer formed by polymerizing from 40–100% by weight of at least one monomeric vinyl aromatic hydrocarbon and 60–0% by weight of an ethylenic comonomer with a graft polymer prepared by graft polymerizing 40–100% by weight of said monomeric vinyl aromatic hydrocarbon and 60–0% by weight of said ethylenic comonomer with a rubbery polymer formed from 50–100% by weight of at least one monomer selected from the group consisting of alkyl acrylates and alkyl methacrylates, each containing between 1-18 carbon atoms in the alkyl group, and 50-0% by weight of an ethylenic comonomer, and (II) 95-5% by weight of a 4,4'-dioxy diarylalkane polycarbonate resin.

This U.S. patent states that properties to be improved differ depending upon the proportions of the components (I) and (II), and that if the quantity of the polycarbonate (II) is larger than 50% by weight, the impact strength and crazing resistance of the polycarbonate (II) will be improved. This patent document takes up polyethylene as an example of a third component which may be included in the composition in addition to the components (I) and (II), but does not at all disclose a polymethylpentene resin, as a third component, and the further incorporation of an isobutylene copolymer rubber composed of a major amount of isobutylene and a minor amount of isoprene. It is quite silent on gasoline resistance, and the intention and specific means of imparting excellent gasoline resistance, excellent low-temperature impact strength, excellent resistance to the deterioration of impact strength by heat aging and excellent mold releasability. As will be shown in a comparative experiment to be described hereinbelow, if the isobutylene copolymer rubber is omitted from the composition of this invention, it is impossible to achieve excellent gasoline resistance, excellent low-temperature impact strength, and excellent mold releasability in a well-balanced combination.

U.S. Pat. No. 4,245,058 (issued on Jan. 13, 1981; corresponding to Japanese Laid-Open Patent Publication No. 49751/1981) discloses a ternary composition comprising a high-molecular-weight thermoplastic aromatic polycarbonate, an acrylate copolymer and a polyolefin. This U.S. patent states that the above composition exhibits improved aged impact strength, and certain formulations thereof exhibit improved impact strength at both low and high temperatures when compared with unmodified polycarbonate resins, and that these compositions also exhibit good weldline strength. The patent, however, does not disclose an elastomeric acrylic graft copolymer, and the conjoint use of an isobutylene copolymer rubber composed of a major amount of isobutylene and a minor amount of isoprene. Moreover, this U.S. patent does not give polymethylpentene resin as an example of the polyolefin. It is also silent on gasoline resistance, and the intention and specific means of imparting excellent gasoline resistance, excellent low-temperature impact strength, excellent resistance to the deterioration of impact strength by heat aging and excellent mold releasability. As stated above, if the isobutylene copolymer rubber is omitted from the composition of this invention, the improvements intended by this invention cannot be achieved.

The present inventors made extensive investigations in order to remove the defects of the aforesaid conventional polycarbonate resin compositions, and to provide a new and useful polycarbonate resin composition capable of giving molded articles having excellent gasoline resistance and high impact strength even in a cold atmosphere.

Consequently, it was found important to improve mold releasability (poor releasability causes strains in the molded articles in releasing them), to reduce a residual stress in the molded articles and to prevent the penetration of gasoline through the molded articles. Further investigations based on this discovery were undertaken in order to develop a polycarbonate resin composition comprising a major proportion of polycarbonate, which meets the above requirement and has the improved properties in a well-balanced combination. These investigations have now led to the discovery that a polycarbonate resin composition comprising the four components (A), (B), (C) and (D) in the proportions specified hereinabove as main components has excellent resistance to solvents, particularly to gasoline, excellent impact strength particularly at low temperatures, excellent resistance to the deterioration of impact strength by heat aging, and excellent mold releasability during molding in a well-balanced combination.

It is an object of this invention therefore to provide a four-component polycarbonate resin composition having excellent improved properties.

The above and other objects and advantages of this invention will become more apparent from the following description.

The composition of this invention comprises the following four resin or rubber components as main components.

(A) 100 parts by weight of a polycarbonate resin, (B) 0.3 to 10 parts by weight of a polymethylpentene resin, (C) 0.3 to 10 parts by weight of an elastomeric acrylic graft copolymer resin composed of a crosslinked acrylic copolymer containing not less than 3% by weight of butadiene as a comonomer and being free from ethylene as a trunk polymer and, grafted thereto, at least one grafting monomer selected from the group consisting of styrene, alkyl acrylates and alkyl methacrylates, and (D) 0.3 to 10 parts by weight of an isobutylene copolymer rubber composed of a major amount of isobutylene and a minor amount of isoprene.

The total amount of (B), (C) and (D) is 2 to 20 parts by weight.

It is presumed that the excellent improved properties of the polycarbonate resin composition of this invention are achieved by the interaction of the above four specified components in the specified proportions. No detail of this mechanism has been elucidated, however. The above presumption has been derived from the fact that as shown in comparative runs given hereinbelow, the excellent improved properties cannot be achieved by compositions which lack any one of the three components (B) to (D).

The polycarbonate resin composition of this invention has superior mold releasability. Accordingly, it can be molded into large-sized or complexly-shaped articles having a low residual stress. Since these molded articles maintain a high impact strength even in a cold atmosphere and have greatly improved solvent resistance, they do not undergo stress cracking upon contact with gasoline and can fully withstand impact in a cold climate. Accordingly, the polycarbonate resin composition of this invention can be widely used in applications which require resistance to gasoline, etc., for example as automotive parts. It can be especially advantageously used as an automobile bumper which requires impact strength in a cold climate.

The polycarbonate resin (A) used in this invention can be produced by a method known per se, for example by reacting a dihydric phenol with a carbonate precursor such as phosgene in the presence of an acid acceptor and a molecular weight controlling agent, or by ester interchange reaction between a dihydric phenol and a carbonate-precursor such as diphenyl carbonate.

Preferred dihydric phenols are bisphenols, and bisphenol A [i.e., 2,2-bis(4-hydroxyphenyl)propane] is especially preferred. Bisphenol A may be partly or wholly replaced by another dihydric phenol. Examples of dihydric phenols other than bisphenol A include hydroquinone, 4,4'-dihydroxydiphenyl, bis(4-hydroxyphenyl)-methane, 1,1-bis(4-hydroxyphenyl)cyclohexane, 2,2-bis(3,5-dimethyl-4-hydroxyphenyl)propane, bis(4-hydroxyphenyl) sulfide, bis(4-hydroxyphenyl)sulfone, bis(4-hydroxyphenyl) sulfoxide, bis(4-hydroxyphenyl)ketone, bis(4-hydroxyphenyl)ether, and halogenated bisphenols such as 2,2-bis(3,5-dibromo-4-hydroxyphenyl)propane.

The polycarbonate resin may also be a homopolymer of such a dihydric phenol, a copolymer of two or more of such dihydric phenols, or a mixture of such polymers and/or such copolymers.

These polycarbonate resins may be easily obtained commercially.

Examples of preferred polycarbonate resins as component (A) are polycarbonates of bisphenol A, copolycarbonates of bisphenol A and not more than 20 mole%, based on the entire dihydric alcohol component, of bis(4-hydroxyphenyl)methane, 1,1-bis(4-hydroxyphenyl)cyclohexane, bis(4-hydroxyphenyl)sulfone, 2,2-bis(3,5-dimethyl-4-hydroxyphenyl)propane, or 2,2-bis(3,5-dibromo-4-hydroxyphenyl)propane, and mixtures of bisphenol A polycarbonates with not more than 20% by weight, based on the entire mixture, of a homopolycarbonate of bis-(4-hydroxyphenyl)methane, 1,1-bis(4-hydroxyphenyl)cyclohexane, bis(4-hydroxyphenyl)sulfone, 2,2-bis(3,5-dimethyl-4-hydroxyphenyl)propane or 2,2-bis-(3,5-dibromo-4-hydroxyphenyl)propane. The bisphenol A polycarbonates are especially preferred.

The polymethylpentene resin (B) used in the composition of this invention may, for example, be polymers based on 4-methylpentene-1, preferably those having a density of about 0.83 to about 0.84. Such a resin is commercially available, for example from Mitsui Petrochemical Industries, Ltd. under the tradename "TPX."

The elastomeric acrylic graft copolymer used as component (C) in this invention is composed of a crosslinked acrylic copolymer containing not less than 3% by weight, preferably 3 to 40% by weight, more preferably 5 to 30% by weight, of butadiene as a comonomer and being free from ethylene as a trunk polymer and, grafted thereto, at least one grafting monomer selected from the group consisting of styrene, alkyl acrylates and alkyl methacrylates.

Examples of acrylic components which form the crosslinked acrylic copolymer include alkyl acrylates, preferably those having 2 to 12 carbon atoms in the alkyl group, and alkyl methacrylates, preferably those having 1 to 4 carbon atoms in the alkyl group. Specific examples of the alkyl acrylates are 2-ethylhexyl acrylate, n-butyl acrylate, 2-methylbutyl acrylate, ethyl acrylate, n-hexyl acrylate and n-dodecyl acrylate. Specific examples of the alkyl methacrylates are methyl methacrylate, ethyl methacrylate and n-butyl methacrylate. Crosslinking agents which may be used in crosslinking the acrylic copolymer include, for example, ethylene glycol dimethacrylate, diethylene glycol diacrylate, divinylbenzene and divinyltoluene.

Examples of the alkyl acrylates and methacrylates as the grafting monomer to be grafted to the trunk polymer may be the same as those given above with regard to the trunk polymer. The grafting monomer may include a small amount of acrylonitrile.

The elastomeric acrylic graft copolymer and a method for its production are known. It can be produced, for example, by emulsion-polymerizing 35 to 60 parts by weight of an alkyl acrylate, 5 to 20 parts by weight of butadiene and 0 to 10 parts by weight of an alkyl methacrylate in the presence of 0.6 to 1.3 parts by weight of a crosslinking agent, adding a flocculating agent to the resulting latex to adjust its average particle diameter preferably to about 0.13–0.20 micron, and grafting the grafting monomer to the resulting latex-like rubber (trunk polymer). The grafting can be effected, for example, by graft-polymerizing 20 to 25 parts by weight of a monomeric mixture composed of 5 to 15 parts by weight of styrene, 5 to 15 parts by weight of methyl methacrylate, 0 to 10 parts by weight of acrylonitrile and 0.1 to 0.3 part by weight of a crosslinking agent as a first grafting component with 65 parts by weight of the latex-like rubber (trunk polymer), and further graft-polymerizing 10 to 15 parts of a monomeric mixture consisting of 10 to 15 parts by weight of methyl methacrylate and 0.1 to 0.3 part by weight of a crosslinking agent as a second grafting component.

The aforesaid elastomeric acrylic graft copolymer (C) and the method for its production are described in detail, for example in U.S. Pat. Nos. 3,842,144, 3,886,232, and 3,886,235 which disclose such a graft copolymer as a modifying component. Such graft copolymers are commercially availble, and for example, a resin sold under the trademark HIA-15 can be obtained from Kureha Chemical Industry Co., Ltd.

A copolymer usually called "butyl rubber" can be used as the isobutylene copolymer rubber (D) in the composition of this invention. It is, for example, a copolymer rubber composed of 93 to 99% by weight of isobutylene and 7 to 1% by weight of isoprene. Such a copolymer rubber and a method for its production are known, and the copolymer rubber is commercially available. The isobutylene copolymer rubber (D) can be produced, for example, by copolymerizing 93 to 99% by weight of isobutylene and 7 to 1% by weight of isoprene in the presence of a Friedel-crafts type metal halide catalyst such as aluminum chloride at a low temperature, for example at about −100° C. Preferably, the copolymer rubber (D) has a relatively high melt viscosity. Examples of the commercially available copolymer rubber (D) are IIR-065 and IIR-268 (trademark for products of Nippon Butyl Co., Ltd.) and Exxon Butyl-065 (a trademark for a product of Exxon Chemical Co.).

The amounts of the components (B), (C) and (D), per 100 parts by weight of the polycarbonate resin (A), in the polycarbonate resin composition of this invention are each 0.3 to 10 parts by weight, preferably 0.5 to 8 parts by weight, especially preferably 1 to 5 parts by weight, and the total amount of the components (B), (C) and (D) is 2 to 20 parts by weight, preferably 5 to 15 parts by weight. If the amount of each of the components (B), (C) and (D) is less than 0.3 part by weight and/or if the total amount of these components is less than 2 parts by weight, it is impossible to impart the excellent gasoline resistance, excellent low-temperature impact strength, excellent resistance to the deterioration of impact strength by heat aging and excellent mold releasability in a well-balanced combination as contemplated by the present invention. If the amount of each of the components (B), (C) and (D) exceeds 10 parts by weight and/or the total amount of these components exceeds 20 parts by weight, the above excellent properties can neither be achieved in a well-balanced combination, and moreover, delamination occurs to degrade the appearance of the molded articles.

In a preferred embodiment of the invention, there can be provided a polycarbonate resin composition having excellent solvent resistance, especially gasoline resistance, excellent low-temperature impact strength, excellent resistance to the deterioration of impact strength by heat aging, and excellent mold releasability in a well-balanced combination, which, according to the testing methods described below, has a flexural strength retention of at least about 80% in a bending test in a solvent (gasoline), a flexural strength retention of at least about 80% in a bending test in methyl isobutyl ketone, no cracking in a bolt clamping test in carbon tetrachloride, a releasability of not more than about 70 kg, and in many cases not more than 50 kg, in a mold releasability test, an Izod impact strength of at least about 50 kg.cm/cm (3.18 mm thick) in an impact resistance test at $-20°$ C., and a heat aging resistance (after heat-treatment) of at least about 55 kg.cm/cm in an impact strength heat aging test (125° C.×100 hours; 3.18 mm thick).

The polycarbonate resin composition of this invention can be prepared by mixing the polycarbonate resin (A), the polymethylpentene resin (B), the elastomeric acrylic graft copolymer resin (C) and the isobutylene copolymer rubber (D) by using any known kneading means by which these components can be mixed uniformly. For example, the four components (A), (B), (C) and (D) may be mixed by a mixer such as a V-type blender or a super mixer and then melt-mixed in an extruder; or they are melt-mixed by a mixer such as a Co-Kneader. Or components (B), (C) and (D), components (B) and (C) and components (B) and (D) may be respectively mixed by a mixer such as a kneading roll or a Bunbury mixer, and the resulting mixture may be mixed in the molten state with the remaining component or components. Among these methods, those which involve two or more melt-mixing operations are preferred because they increase the degree of mixing.

The melt-mixing can be effected at a temperature at which a component having the highest melting point can be melted. For example, the temperature is about 230° to about 300° C.

In addition to the essential components (A), (B) (C) and (D), the polycarbonate resin composition of this invention may include various additives ordinarily incorporated in resin compositions of this type.

Such additives are, for example, about 0.5 to about 20 parts by weight of a filler or a reinforcing agent; about 0.01 to about 0.1 part by weight of a heat stabilizer; about 0.01 to about 0.2 part by weight of an antioxidant; about 0.1 to about 0.7 part by weight of a light stabilizer; about 0.1 to about 10 parts by weight of a fire retardant; about 0.5 to about 3 parts by weight of a plasticizer; about 0.1 to about 3 parts by weight of an antistatic agent; about 0.1 to about 1 part by weight of a mold releasing agent; about 0.3 to about 1 part by weight of a blowing agent; and about 1 to about 10 parts by weight of another resin or rubber miscible with these components. As the above other resin or rubber, resins and rubbers other than polyethylene resins can be used. The above amounts of the additives are based on 100 parts by weight of the polycarbonate resin.

Examples of the filler or reinforcing agent include glass fibers, asbestos, carbon fibers, silica, talc and calcium carbonate.

Examples of the heat stabilizer include triphenyl phosphite, tris-(2,6-dimethylphenyl)phosphite, tris-(mixed mono- and di-nonylphenyl)phosphite, dimethylbenzene phosphonate and trimethyl phosphate.

Examples of the antioxidant include octadecyl-3-(3,5-di-tert-butyl-4-hydroxyphenyl)propionate, and pentaerythrityl-tetrakis[3-(3,5-di-tert-butyl-4-hydroxyphenyl)propionate].

Examples of the light stabilizer include 2-(2-hydroxy-5-methylphenyl)benzotriazole, 2-(2-hydroxy-5-tert-octylphenyl)-benzotriazole and 2-hydroxy-4-n-octoxy benzophenone.

Examples of the fire retardant include 2,2-bis(3,5-dibromo-4-hydroxyphenyl)propane, hexabromocyclododecane, sodium 3,5-dibromobenzenesulfonate and sodium lauryl sulfate.

Examples of the plasticizer include dioctyl-4,5-epoxy-hexahydrophthalate, tris-(octoxycarbonylethyl) isocyanurate, tristearin and epoxidized soybean oil.

Examples of the antistatic agent include glycerol monostearate, sodium stearyl sulfonate, and sodium dodecylbenzenesulfonate.

Examples of the mold releasing agent include stearyl stearate, beeswax, montan wax and paraffin wax.

Examples of the other resin are polypropylene, polystyrene, polymethyl methacrylate, AS resin, ABS resin, MBS resin, and polyphenylene oxide.

Such additives may be mixed at a suitable time during the mixing of the components for forming the composition.

The following examples illustrate the present invention more specifically. All parts in these examples are by weight. The various properties shown in these examples were measured by the following methods.

[I] Solvent resistance

[I-a] Bending test in a solvent

Bending test samples, 127 mm×12.7 mm×6.35 mm, were molded from pre-dried pellets by means of an injection molding machine. One sample was treated at a temperature of 23° C. and a humidity of 50% for 24 hours, and the flexural strength (a) of the sample was measured at 23° C. by means of a universal tensile compression testing machine (Model TOM500D, a product of Shinko Co., Ltd.). Another test sample was treated at a temperature of 23° C. and a humidity of 50% and then dipped for 15 seconds in gasoline (regular gasoline, produced by Maruzen Oil Co., Ltd.). In the dipped state, the flexural strength (b) of the sample was measured in the same way as in the air. A similar test was performed using methyl isobutyl ketone (MIBK) instead of the gasoline.

The solvent resistance was evaluated by strength retention (c)=[(b)/(a)]×100 (%). Higher percent retentions mean better solvent resistance.

[I-b] Bolt clamping test

A flat plate, 127 mm×127 mm×3 mm, was molded from pre-dried pellets by means of an injection molding machine. Holes with a diameter of 6 mm were bored in the plate by a drill, and the plate was treated at a temperature of 23° C. and a humidity of 50% for 24 hours. After the treatment, the plate was clamped with M6 bolts and nuts at a torque of 50 kg.cm. Carbon tetrachloride (reagent grade first class) was coated on the plate, and 5 minutes later, the plate was examined for the occurrence of cracks. The absence of cracks shows excellent solvent resistance.

[II] Mold releasing test

Pre-dried pellets were continuously molded into cup-like articles having a wall thickness of 4 mm, a height of 20 mm and a bottom diameter of 63 mm at a cylinder temperature of 300° C. and a mold temperature of 80° C. The releasing mold load of a molded article obtained in the 30th shot was measured by a strain gauge fixed to the ejector plate of the mold. Lower mold releasing loads (kg) show better mold releasability.

[III] Impact strength

Test samples, 64 mm×12.7 mm×3.18 mm, were molded from predried pellets by means of an injection molding machine. The impact strength of these test samples was measured in accordance with ASTM-D256. Higher impact strength (kg.cm/cm) show higher resistance to impact.

[III-a] Impact strength test at low temperatures

The notched test sample, 64 mm×12.7 mm×3.18 mm, obtained in [III] above was left to stand in a constant temperature vessel at −20° C. for 1 hour. Then, it was taken out of the vessel, and its impact strength was immediately measured by an Izod impact tester (a product of Toyo Seiki Kabushiki Kaisha). Higher impact strength (kg.cm/cm) shows higher resistance to impact at low temperatures.

[III-b] Test for resistance to the deterioration of impact strength by heat aging

EXAMPLE 1 AND COMPARATIVE EXAMPLES 1 TO 6

One hundred parts of pre-dried polycarbonate resin (Panlite L-1250, a trademark for a bisphenol A-type polycarbonate manufactured by Teijin Chemicals, Ltd.) [A] was mixed at room temperature with polymethylpentene resin TPX RT-18, a trademark for a product of Mitsui Petrochemical Industries, Ltd.; density 0.835 [B], an elastomeric acrylic graft copolymer (HIA-15, a trademark for a product of Kureha Chemical Industry Co., Ltd.) [C] and isobutylene copolymer rubber (IIR-065, a trademark for a product of Nippon Butyl Co., Ltd.) [D] in the amounts indicated in Table 1 by means of a V-type blender to form a polycarbonate resin composition. The composition was then melt-extruded at 280° C. by using an extruder having a screw diameter of 30 mm (Model VSK-30 made by Chuo Machinery Co., Ltd.) to form pellets. The pellets were molded and tested by the methods described hereinabove.

For comparison, Table 1 also shows the results obtained in Comparative Examples 1, 2 and 3 which were performed in the same way as in Example 1 except that any one of the polymethylpentene resin, the elastomeric acrylic copolymer and the isobutylene copolymer rubber was omitted, and Comparative Examples 4 to 6 which were performed in the same way as in Example 1 except that any two of the above components (B), (C) and (D) were omitted.

TABLE 1

| Run (*) | Resin composition (parts) [B] | [C] | [D] | Resistance to gasoline [I-a] (%) | MIBK [I-a] (%) | CCl₄ [I-b] cracking | Mold releasability (kg) | Low-temperature impact strength (kg · cm/cm) | Resistance to the deterioration of impact strength by heat aging at 125° C. for 100 hours (kg · cm/cm) before treatment | after treatment |
|---|---|---|---|---|---|---|---|---|---|---|
| Ex. 1 | 2 | 3 | 2 | 83 | 82 | No | 50 | 77 | 82 | 72 |
| CEx. 1 | 2 | 3 | 0 | 68 | 61 | Yes | 75 | 68 | 88 | 63 |
| CEx. 2 | 2 | 0 | 2 | 73 | 57 | Yes | 65 | 30 | 85 | 65 |
| CEx. 3 | 0 | 3 | 2 | 65 | 71 | Yes | 80 | 25 | 80 | 62 |
| CEx. 4 | 7 | 0 | 0 | 69 | 63 | Yes | 50 | 42 | 63 | 35 |
| CEx. 5 | 0 | 7 | 0 | 63 | 59 | Yes | 90 | 66 | 74 | 68 |
| CEx. 6 | 0 | 0 | 7 | 68 | 65 | Yes | 70 | 20 | 71 | 12 |

(*)Ex. = Example,
CEx. = Comparative Example

The notched test sample prepared in [III] above was left to stand in a constant temperature vessel at 125° C. for 100 hours. Then, it was taken out of the vessel, and treated at a temperature of 23° C. and a humidity of 50% for 24 hours. After the above heat aging treatment, the impact strength of the sample was measured by the aforesaid Izod impact tester. Higher impact strength (kg.cm/cm) shows higher resistance to the deterioration of impact strength by heat aging.

EXAMPLES 2 TO 10 AND COMPARATIVE EXAMPLES 7 TO 8

The procedure of Example 1 was followed except that the amounts of the polymethylpentene resin (B), the elastomeric acrylic copolymer (C) and the isobutylene copolymer rubber (D) were changed as shown in Table 2. The results are shown in Table 2.

Table 2 also shows the results obtained in Comparative Examples 7 and 8 which were carried out in the same way as above except that the total amount of the components (B), (C) and (D) was outside the range specified by this invention.

TABLE 2

| | Resin composition (parts) | | | Resistance to gasoline [I-a] (%) | Resistance to MIBK [I-a] (%) | CCl₄ [I-b] cracking | Mold releasability | Low-temperature impact strength (kg·cm/cm) | Resistance to the deterioration of impact strength by heat aging at 125° C. for 100 hours (kg·cm/cm) | |
|---|---|---|---|---|---|---|---|---|---|---|
| Run | [B] | [C] | [D] | | | | (kg) | | before treatment | after treatment |
| Ex. 2 | 1 | 2 | 2 | 81 | 82 | No | 60 | 56 | 83 | 62 |
| Ex. 3 | 1 | 3 | 3 | 86 | 85 | No | 70 | 64 | 82 | 68 |
| Ex. 4 | 2 | 2 | 3 | 86 | 86 | No | 45 | 54 | 80 | 71 |
| Ex. 5 | 3 | 2 | 1 | 81 | 80 | No | 40 | 53 | 84 | 72 |
| Ex. 6 | 3 | 3 | 2 | 82 | 81 | No | 40 | 73 | 86 | 74 |
| Ex. 7 | 4 | 4 | 3 | 83 | 82 | No | 35 | 65 | 78 | 73 |
| Ex. 8 | 4 | 6 | 4 | 84 | 85 | No | 35 | 56 | 73 | 62 |
| Ex. 9 | 5 | 5 | 2 | 82 | 81 | No | 30 | 62 | 83 | 71 |
| Ex. 10 | 5 | 8 | 4 | 88 | 87 | No | 30 | 56 | 72 | 59 |
| CEx. 7 | 0.5 | 0.5 | 0.5 | 61 | 55 | Yes | 100 | 17 | 90 | 12 |
| CEx. 8 | 7 | 8 | 7 | 89 | 87 | No | 30 | 25 | 62 | 49 |

EXAMPLES 11 TO 13

The procedure of Example 1 was followed except that a mixture of 95 parts of a bisphenol A type polycarbonate resin (Panlite K-1300, a trademark for a product of Teijin Chemicals, Ltd.) and 5 parts of a polycarbonate resin of 2,2-bis(3,5-dibromo-4-hydroxyphenyl)propane (Fireguard FG-7000, a trademark for a product of Teijin Chemicals, Ltd.) was used as the polycarbonate resin (A), polymethylpentene resin having a density of 0.840 (TPX. MX-001, a trademark for a product of Mitsui Petrochemical Industries, Ltd.) was used as the polymethylpentene resin (B), and butyl rubber (IIR-268, a trademark for a product of Nippon Butyl Co., Ltd.) was used as the isobutylene copolymer rubber (D). The results are shown in Table 3.

TABLE 3

| | Resin composition (parts) | | | Resistance to gasoline [I-a] (%) | Resistance to MIBK [I-a] (%) | CCl₄ [I-b] cracking | Mold releasability | Low-temperature impact strength (kg·cm/cm) | Resistance to the deterioration of impact strength by heat aging at 125° C. for 100 hours (kg·cm/cm) | |
|---|---|---|---|---|---|---|---|---|---|---|
| Run | [B] | [C] | [D] | | | | (kg) | | before treatment | after treatment |
| Ex. 11 | 2 | 3 | 2 | 81 | 80 | No | 55 | 65 | 81 | 63 |
| Ex. 12 | 3 | 3 | 2 | 82 | 81 | No | 50 | 63 | 79 | 59 |
| Ex. 13 | 5 | 5 | 2 | 83 | 81 | No | 40 | 62 | 76 | 57 |

What we claim is:

1. A polycarbonate resin composition comprising as main components
   (A) 100 parts by weight of a polycarbonate resin derived from not less than 80 mole% of 2,2-bis(4-hydroxyphenyl)propane,
   (B) 0.3 to 10 parts by weight of a polymethylpentene resin,
   (C) 0.3 to 10 parts by weight of an elastomeric acrylic graft copolymer containing not less than 3% by weight of butadiene as a comonomer and being free from ethylene as a trunk polymer and, grafted thereto, at least one grafting monomer selected from the group consisting of styrene, alkyl acrylates and alkyl methacrylates, and
   (D) 0.3 to 10 parts by weight of an isobutylene copolymer rubber composed of a major amount of isobutylene and a minor amount of isoprene, the total amount of (B), (C) and (D) being 2 to 20 parts by weight.

2. The composition of claim 1 wherein the polymethylpentene resin (B) is at least one polymethylpentene having a density of about 0.83 to about 0.84.

3. The composition of claim 1 wherein the trunk polymer of the acrylic copolymer (C) is a polymer having an average particle diameter of 0.13 to 0.20 micron and derived from 35 to 60 parts by weight of an alkyl acrylate having 2 to 12 carbon atoms in the alkyl group, 5 to 20 parts by weight of butadiene, an alkyl methacrylate having 1 to 4 carbon atoms in the alkyl group and 0.6 to 1.3 parts by weight of a crosslinking agent, and the grafting monomer is a mixture of styrene and methyl methacrylate.

4. The composition of claim 1 wherein the isobutylene copolymer rubber (D) is a copolymer rubber composed of 93 to 99% by weight of isobutylene and 7 to 1% by weight of isoprene.

5. The composition of claim 1 wherein the polymethylpentene resin (B) is at least one polymethylpentene having a density of about 0.83 to about 0.84; the trunk polymer of the acrylic copolymer (C) is a polymer having an average particle diameter of 0.13 to 0.20 micron and derived from 35 to 60 parts by weight of an alkyl acrylate having 2 to 12 carbon atoms in the alkyl group, 5 to 20 parts by weight of butadiene, an alkyl methacrylate having 1 to 4 carbon atoms in the alkyl group and 0.6 to 1.3 parts by weight of a crosslinking agent, and the grafting monomer is a mixture of styrene and methyl methacrylate, and the isobutylene copolymer rubber (D) is a copolymer rubber composed of 93 to 99% by weight of isobutylene and 7 to 1% by weight of isoprene.

6. The composition of claim 5 wherein the polycarbonate resin (A) is a homopolymer of 2,2-bis(4-hydroxyphenyl)propane or a copolymer of 2,2-bis(4-hydroxyphenyl)propane and not more than 20 mole%, based on the entire dihydric alcohol component of said polycarbonate, of bis(4-hydroxyphenyl)-methane, 1,1-bis(4-hydroxyphenyl)cyclohexane, bis(4-hydroxyphenyl)-sulfone, 2,2-bis(3,5-dimethyl-4-hydroxyphenyl)propane, or 2,2-bis(3,5-dibromo-4-hydroxyphenyl)propane.

7. The composition of claim 5 wherein the polymethylpentene resin (B) is a polymer of 4-methylpentene-1.

8. The composition of claim 5 which comprises per 100 parts by weight of the polycarbonate resin (A), 0.5 to 8 parts by weight of each of the polymethylpentene resin (B), the elastomeric acrylic graft copolymer resin (C) and the isobutylene copolymer rubber (D) and wherein the total amount of the components (B), (C) and (D) is from 5 to 15 parts by weight.

9. The composition of claim 1 which comprises per 100 parts by weight of the polycarbonate resin (A), 0.5 to 8 parts by weight of each of the polymethylpentene resin (B), the elastomeric acrylic graft copolymer resin (C) and the isobutylene copolymer rubber (D) and wherein the total amount of the components (B), (C) and (D) is from 5 to 15 parts by weight.

10. The composition of claim 1 which is characterized by a flexural strength retention of at least about 80% in a bending test in gasoline solvent and in methyl isobutyl ketone solvent, an absence of cracking in a bolt clamping test in carbon tetrachloride, a releasability of not more than about 70 kg in a mold releasability test, an Izod impact strength of at least about 50 kg·cm/cm for a sample 3.18 mm thick in an impact resistance test at $-20°$ C., and a heat aging resistance after heat-treatment at 125° C. for 100 hours for a test specimen 3.18 mm thick of at least about 55 kg·cm/cm in an impact strength heat aging test.

* * * * *